United States Patent [19]

Childers et al.

[11] Patent Number: 5,499,233

[45] Date of Patent: Mar. 12, 1996

[54] OPTICAL DISK CARRIER WITH WRITE-PROTECT MECHANISM

[75] Inventors: Edwin R. Childers; Michael Henry, both of Tucson, Ariz.

[73] Assignee: International Business Machines Corporation, Armonk, N.Y.

[21] Appl. No.: 262,671

[22] Filed: Jun. 20, 1994

[51] Int. Cl.⁶ .............................. G11B 3/70; G11B 5/84; G11B 7/26
[52] U.S. Cl. .............................. 369/291; 369/289; 360/133
[58] Field of Search ............................. 369/291, 192, 369/36, 289; 360/133, 132, 75.2

[56] References Cited

U.S. PATENT DOCUMENTS

| | | | |
|---|---|---|---|
| 4,803,678 | 2/1989 | Tanaka et al. | 369/291 |
| 4,811,151 | 3/1989 | Kanazawa et al. | 360/133 |
| 4,817,079 | 3/1989 | Covington et al. | 369/291 |
| 4,819,114 | 4/1989 | Bernitt et al. | 360/133 |
| 4,881,218 | 11/1989 | Yamamori | 369/291 |

*Primary Examiner*—Stuart S. Levy
*Assistant Examiner*—Adriana Giordana
*Attorney, Agent, or Firm*—D. A. Shifrin

[57] ABSTRACT

The present invention provides an optical disk carrier having the same length and width as an ISO standard cartridge but with a reduced thickness and further having the same sensing and handling features as are found on a conventional, full-thickness cartridge. When reduced-thickness carriers are used in an automated optical storage and retrieval library, the storage density of the library can be significantly increased.

1 Claim, 3 Drawing Sheets

OPTICAL DISK CARRIER WITH WRITE-PROTECT MECHANISM

TECHNICAL FIELD OF THE INVENTION

The present invention relates to optical storage media and, in particular, to a carrier for an optical disk.

BACKGROUND OF THE INVENTION

Optical storage media typically takes the form of a thin (approximately 2.5 mm thick), rotatable disk, such as 90 or 130 mm in diameter, having one or two active surfaces to and from which information can be written and read when the disk is mounted in an optical drive. To reduce the accumulation of dust, body oils (from handling) and other contaminants which can interfere with the reliability of an optical system, optical disks have been housed within rigid cartridges, approximately 11 mm thick. A shutter door on the cartridge slides open when the cartridge is mounted in a drive and provides access to a radial portion of the active surfaces of the disk; the shutter then closes when the cartridge is removed.

Such a cartridge can also include a write-protect mechanism whose position is sensed by the drive: when the mechanism is in one position, the drive is prevented from writing information to the disk. Another feature found on cartridges are sensing holes which indicate to the drive, by their coded positions along the rear edge of a cartridge, the type of disk (such as write-once (WORM) or rewritable magneto-optical (MO), single- or double-sided, and capacity).

Because optical cartridges are frequently used in automated storage and retrieval library systems, the cartridges can also include a notch near the rear of the two sides of the cartridge to enable a robot gripper to securely grasp and transport the cartridge between a storage cell and an optical drive.

It will be appreciated that the need for media protection is reduced in a closed library with reduced human handling and a more controlled environment. It will also be appreciated that the number of optical cartridges which can be stored within a library of a given volume is directly related to the thickness of the cartridges.

OBJECTS AND SUMMARY OF THE INVENTION

It is an object of the present invention to decrease the volume requirements of existing optical media while maintaining compatibility with existing optical drives.

This object and others are achieved in the present invention by providing an optical disk carrier having the same length and width as an ISO standard cartridge but with a reduced thickness (or height) and further having the same sensing and handling features as are found on a conventional, full-thickness cartridge. Consequently, the storage density of a library can be significantly increased, even doubled.

More specifically, the carrier comprises a rectangular frame having a circular central opening with a diameter sized to receive an optical disk. The carrier also includes a set of disk holders spaced around the circumference of the circular opening and secured to the frame for releasably retaining the optical disk within the circular opening. One of the disk holders comprises a leaf spring positioned substantially in the center of the rear edge of the frame having a central portion with a grooved face for engaging the rim of the optical disk, the grooved face being biased towards the circular opening. Two additional disk holders each comprise an arm pivotably mounted in a front corner of the frame. Each of the arms has a first end portion with a grooved face for engaging the rim of the optical disk and, like the grooved face of the leaf spring, the grooved faces of the arms are biased towards the circular opening of the frame.

A write-protect mechanism is located in a corner along the rear edge of the frame; a second write-protect mechanism can be located in the other corner along the rear edge if the carrier is to be used with double-sided media. For full compatibility with existing ISO standard optical cartridges, the carrier can also include locating features, handling notches and coded disk-type sensing holes.

In operation, an optical disk is inserted into the circular opening within the carrier frame and engaged by the disk holders. The carrier is loaded directly into an optical drive, or inserted into an adapter cartridge and loaded into the drive. When the carrier is loaded, the disk holders release the disk which is then accessed in a conventional fashion. Upon removal of the carrier from the drive, the disk holders re-engage the disk and prevent its movement in the carrier.

The foregoing and other features and advantages of the invention will be apparent from the following more particular description of preferred embodiments of the invention, as illustrated in the accompanying drawings.

DETAILED DESCRIPTION OF THE INVENTION

Figure 7:
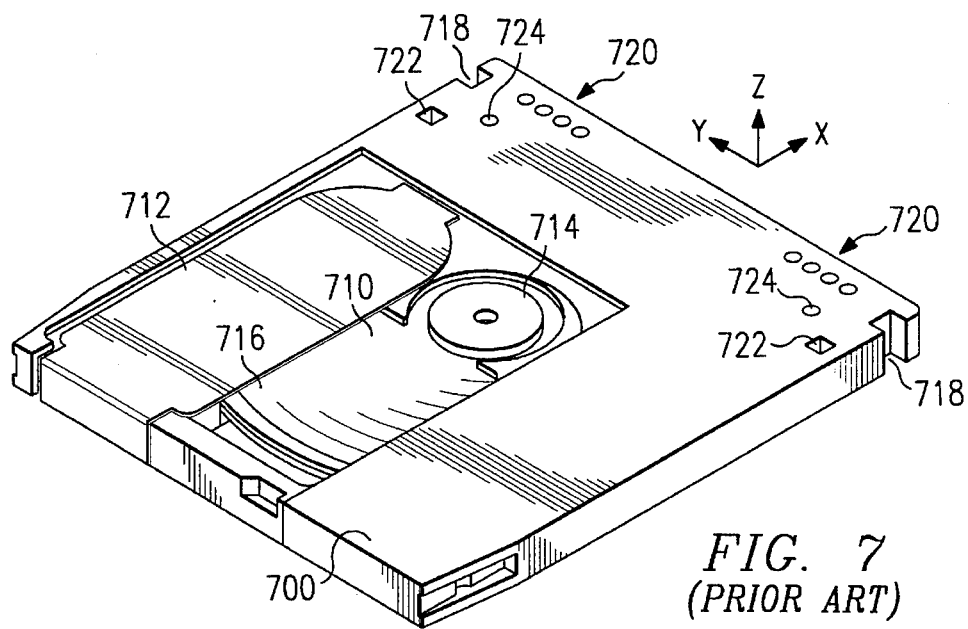
FIG. 7 illustrates a conventional prior art ISO-standard optical cartridge and disk.

FIG. 7 illustrates a conventional prior art ISO-standard optical cartridge 700 and disk 710. The dimensions of the cartridge 700 are approximately 153 mm, 135 mm and 11 mm in the X, Y and Z directions, respectively. The cartridge 700 includes a shutter door 712 in the front half of the cartridge 700 (the front being inserted first into an optical disk drive) which is automatically opened when the cartridge 700 is mounted in an optical drive. When closed, the door 712 seals the disk 710 within the cartridge 700 and protects it from oils from human handling, dust and other debris. The door 712 is shown here in the open position exposing a hub 714 and a portion of one surface 716 of the disk 710. Notches 718 at the rear of the two sides of the cartridge 700 can be used by a robotic gripper in an automated library while coded sensing holes 720 along the rear edge of the cartridge 700 enable sensors in the drive to determine the type of disk (WORM or MO, single- or double-sided, data capacity, and other information) inside the cartridge 700. Locating holes 722, in front of the handling notches 718, allow the cartridge 700 to be properly positioned within the drive upon mounting. Two write-protect holes 724 (one for each of two active surfaces on the disk 710) are also included in the rear corners of the cartridge 700; an open hole prevents the drive from recording data to that surface while a covered hole permits recording.

Figure 1:
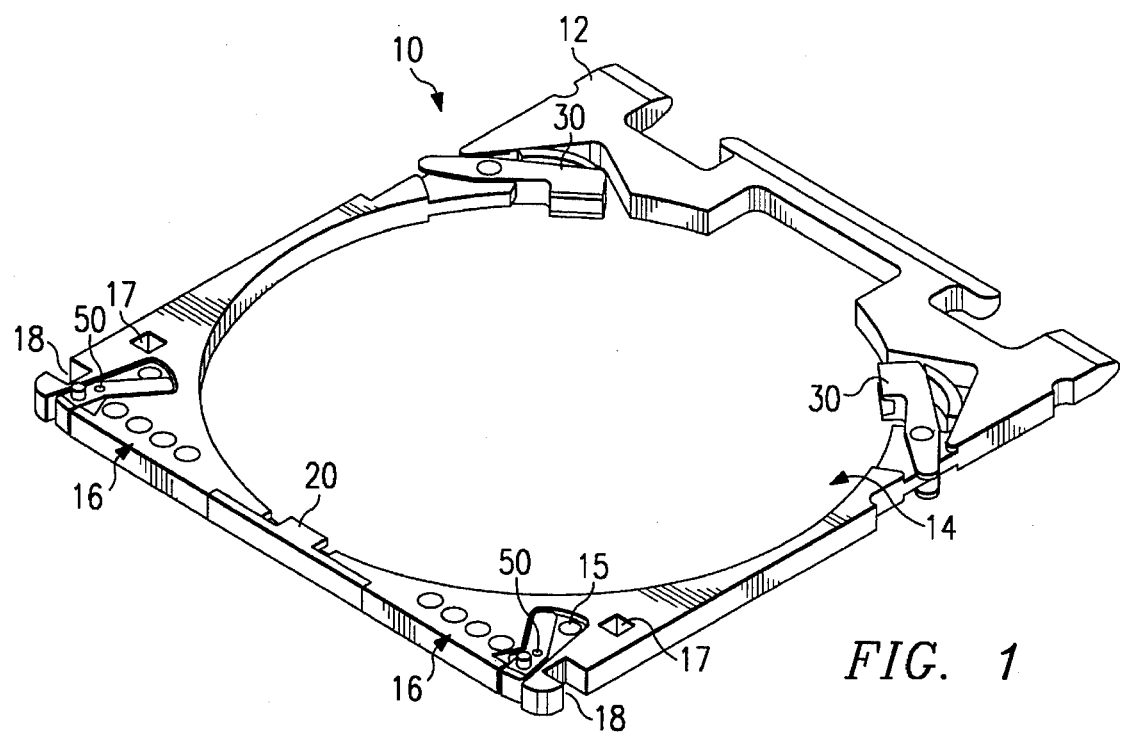
FIG. 1 illustrates a reduced-height optical carrier of the present invention.

FIG. 1 illustrates a reduced-height optical carrier 10 of the present invention, illustrated without an optical disk. The dimensions of the carrier 10 are approximately 153 mm and 135 mm in the X and Y directions, respectively, substantially the same as the length and width of the ISO-standard cartridge 700 of FIG. 7, and about 5 mm in the Z direction, about one-half the thickness of the ISO-standard cartridge 700. Consequently, an automated library of the same volume can store approximately twice the number of optical disks in reduced-height carriers 10 than in standard cartridges 700.

The carrier 10 comprises a substantially rectangular frame 12 with a substantially circular central opening 14. Disk-type sensing holes 16, locating holes 17 and handling notches 18 can be included in their conventional locations along the rear edge and rear corners of the frame 12, thereby ensuring compatibility with the corresponding features of the ISO-standard cartridge 700. The carrier 10 also includes disk holders 20 and 30 positioned around the circumference of the opening 14 and one or two write-protect mechanisms 50 in the rear corners of the frame 12.

Figure 2A:
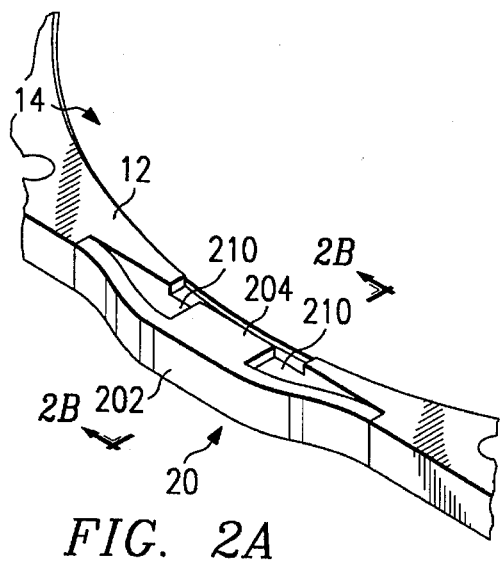
FIG. 2A is a close-up illustration of a first type of disk holder of the present invention.
Figure 2B:
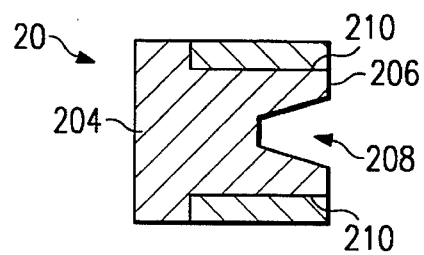
FIG. 2B is a cross-sectional view of the flexible disk holder taken along the line 2B—2B of FIG. 2A.

Preferably, two types of disk holders are deployed around the opening 14 of the carrier 10. FIG. 2A illustrates a first type 20 located in the center of the rear edge of the frame 12. The disk holder 20 comprises a leaf spring 202 fixed at each end to the frame 12. A central portion 204 includes a face 206 (FIG. 2B) with a groove 208 shaped to mate with the rim of an optical disk. On each side of the face 206 is a slotted area 210, having a reduced thickness relative to the central portion 204, to enable the groove 208 to be pushed away from the opening 14 when the frame 12 is mounted in a drive. To accommodate double-sided optical disks, the bottom of the flexible disk holder 20 is symmetrical with the just described top.

Figure 3A:
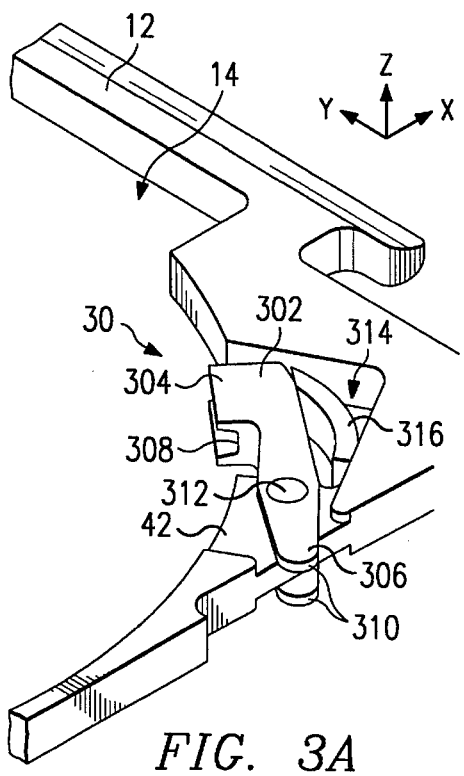
FIG. 3A is a close-up illustration of a second type of disk holder of the present invention, shown in the disk capture position.
Figure 3B:
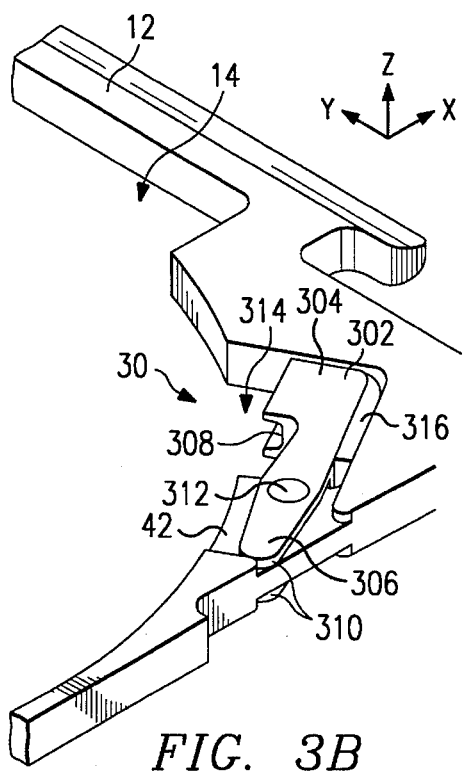
FIG. 3B is a close-up figure of the pivoting disk holder of FIG. 3A in the disk release position.

FIG. 3A illustrates a second type of disk holder 30, located on each of the two sides of the frame 12 near the front corners. The disk holder 30 comprises an arm 302 having an inner-end portion 304 and an outer-end portion 306. The inner-end portion 304 includes a grooved side face 308 shaped to mate with the rim of the optical disk. The outer-end portion 306 is slotted in the plane XY of the frame 12 to enable top and bottom fingers 310 of the outer-end portion 306 to fit around the top and bottom surfaces of a reduced-thickness area 42 of the frame 12. A pin 312 is fixed to the top and bottom fingers 310 and extends freely through a hole in the reduced-thickness area 42. Alternatively, of course, the pin 312 can be fixed to the hole in the reduced-thickness area 42 and extend freely through the top and bottom fingers 310. A cutout 314 in the frame 12 is sized and shaped to receive the inner-end 304 of the arm 302. A spring 316 within the cutout 314 biases the inner-end 304 outward from the cutout 314 partially into the opening 14; when the inner-end 304 is in this position, the outer-end 306 extends outward beyond the side of the frame 12. As illustrated in FIG. 3B, pressure applied to the extended outer-end 306 causes the inner-end 304 to move into the cutout 314 against the compression of the spring 316. It will be appreciated that alternative configurations of the spring-biased pivoting disk holders 30 can also be employed and that they can be located at other positions around the opening 14.

Figure 4:
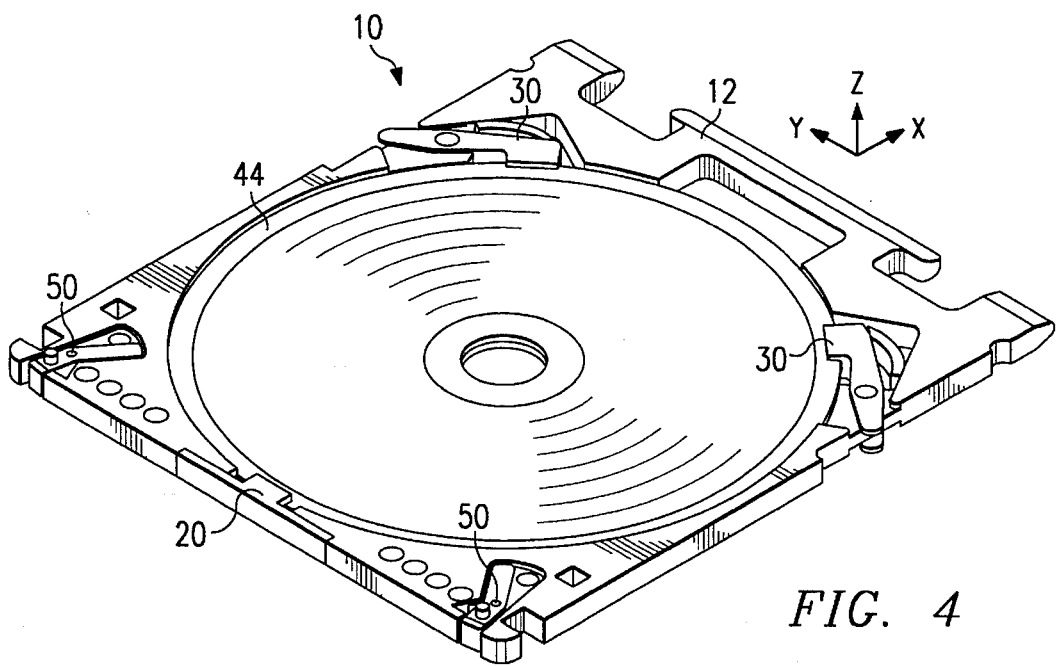
FIG. 4 illustrates the reduced-height optical carrier with an optical disk retained therein.

FIG. 4 illustrates the carrier 10 with an optical disk 44 retained within the opening 14. The disk holders 20 and 30 are urged against the edge of the disk 44, thus preventing the disk 44 from moving within the carrier 10. When the carrier 10 is inserted into a drive, the disk holders 20 and 30 are pushed away from the disk 44, freeing the disk 44 from the carrier 10 to rotate on a drive spindle for normal disk read and write operations. When the disk operations are completed, the disk holders 20 and 30 are allowed to engage the disk 44 and the carrier 10 can be ejected from the drive.

Figure 5A:
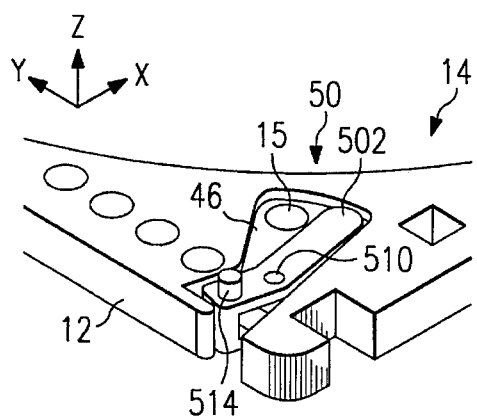
FIGS. 5A and 5B are close-up figures of a pivoting write-protect mechanism of the present invention.
Figure 5B:
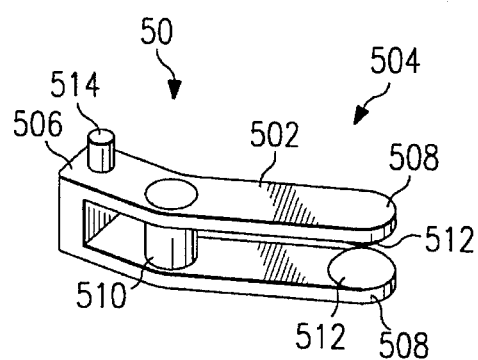

The write protect-mechanism 50 in one or both rear corner(s) of the frame 12 can be of several alternative forms; FIGS. 5A, 5B, 6A and 6B illustrate two examples. FIGS. 5A and 5B illustrate a pivoting write-protect mechanism 50 comprising an arm 502 having an inner-end portion 504 and an outer-end portion 506. The inner-end portion 504 is slotted in the plane XY of the frame 12 to enable top and bottom fingers 508 of the outer-end portion 506 to fit around the top and bottom surfaces of a reduced-thickness area 46 of the frame 12. A pin 510 is fixed to the top and bottom fingers 508 and extends freely through a hole in the reduced-thickness area 46. Or, the pin 510 can be fixed to the hole in the reduced-thickness area 46 and extend freely through the top and bottom fingers 508. Detents 512 protruding from the inner surfaces of the top and bottom fingers 508 mate with the write-protect hole 15 through the frame 12. The arm 502 can thus be pivoted to cover or reveal the hole 15, as desired.

Optionally, the inner-end portion 504 can have a hole therethrough. A pin 514 extends only partially into the hole and protrudes from the upper opening as illustrated. When the carrier 10 is stacked with other carriers, the pin 514 on the top of the arm 502 mates with the corresponding opening on the bottom of the arm of the carrier above and the opening on the bottom of the arm 502 of the carrier 10 mates with the corresponding pin on the top of arm of the carrier below. Then, the write-protect mechanisms of all of the carriers can be pivoted in unison.

Figure 6A:
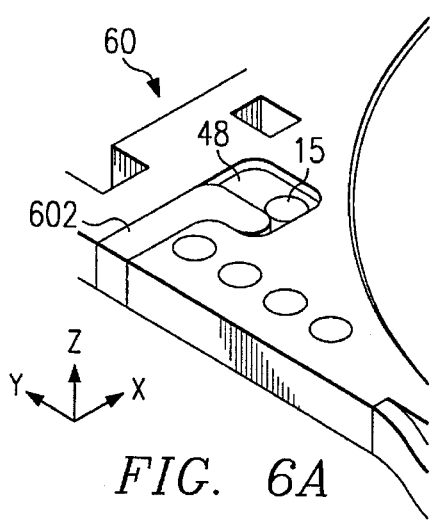
FIGS. 6A and 6B are close-up figures of a sliding write-protect mechanism of the present invention.
Figure 6B:
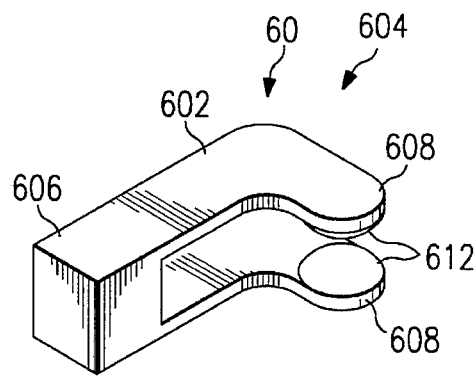

FIGS. 6A and 6B illustrate a sliding write-protect mechanism 60 comprising an arm 602 having an inner-end portion 604 and an outer-end portion 606. The inner-end portion 604 is slotted in the plane XY of the frame 12 to enable top and bottom fingers 608 of the outer-end portion 604 to fit around the top and bottom surfaces of a reduced-thickness area 48 of the frame 12. Detents 612 protruding from the inner surfaces of the top and bottom fingers 608 mate with the write-protect hole 15 through the frame 12. The arm 602 can thus be slid to cover or reveal the hole 15, as desired. It will be appreciated that alternative write-protect mechanisms can be employed.

While the invention has been particularly shown and described with reference to preferred embodiments thereof, it will be understood by those skilled in the art that various changes in form and details may be made therein without departing from the spirit and scope of the invention.

What is claimed is:

1. An optical disk carrier, comprising:
   a substantially rectangular frame having dimensions sized to be inserted into an optical disk drive and having a substantially circular opening with a diameter sized to receive an optical disk, said frame further having front and rear edges;

a write-protect mechanism in a first corner portion of said rear edge of said frame, said write-protect mechanism comprising:
  an arm pivotable about an axis whereby, when said arm is in a first position, a write-protect hole through said frame is exposed and, when said arm is in a second position, said write-protect hole is concealed; and
  an aperture extending vertically through said arm and an elongated member projecting from said aperture, such that, when two optical disk carriers are stacked, said elongated member of a lower carrier engages said aperture of an upper carrier and said write-protect mechanism of each carrier is movable simultaneously; and
a set of disk holders spaced around the circumference of the circular opening and secured to said frame for releasably retaining the optical disk within the circular opening whereby, when the carrier is mounted in an optical drive, said disk holders release the optical disk to be rotated on a spindle in the drive and, when the carrier is removed from the drive, said disk holders retain the disk within the circular opening preventing movement thereof, said set of disk holders comprising:
  a leaf spring positioned substantially in the center of said rear edge of said frame, said leaf spring having a central portion with a grooved face for engaging a circumferential edge of the optical disk, said grooved face being biased towards the circular opening; and
  first and second arms pivotably mounted in first and second corners portions, respectively, of said front edge of said frame, each of said arms having a first end portion with a grooved face for engaging the circumferential edge of the optical disk, said grooved face being biased towards the circular opening.

* * * * *